May 31, 1966  J. L. HUSCHER  3,253,372

POLYVINYL CHLORIDE WINDOW

Filed June 19, 1964

United States Patent Office 3,253,372
Patented May 31, 1966

3,253,372
POLYVINYL CHLORIDE WINDOW
Joseph L. Huscher, Philadelphia, Pa., assignor to Kaykor Products Corporation, Yardville, N.J., a corporation of New Jersey
Filed June 19, 1964, Ser. No. 376,537
5 Claims. (Cl. 52—245)

This invention relates to plastic windows of composition and construction particularly suited for glazing of industrial buildings and subject to such hazards as fire, fume-corrosion, explosion, high wind-loading and blows from hard-velocity objects.

Attempts to replace glass as glazing material by various plastics, specifically, polystyrene, acrylic, cellulose acetate and polyethylene have been unsatisfactory. All of these plastics have at least one serious shortcoming, such as either poor flame-spread characteristics, poor corrosion resistance, low impact resistance, high thermal coefficient of expansion or sensitivity to water-absorption. Also, such plastic panes have in general required special edge-mounting constructions introducing pane-fabrication and installation difficulties.

In accordance with the present invention, a window pane meeting all of the aforesaid requirements and without creating fabrication or insulation problems is shaped from a flat rectangular sheet of polyvinyl chloride to provide a narrow, flat border or marginal area engageable by a window frame to provide the support for a large third-dimensional curved area. Specifically, the maximum depth of the curved surface of the pane from the plane of its flat border is, in the usual case of an oblong pane, not more than about 7½ percent of the longitudinal span of the curved area and not less than about 7½ percent of the transverse span of the curved area.

Figure 1:
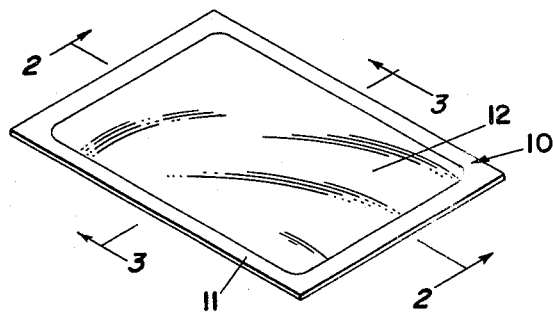
Figure 2:
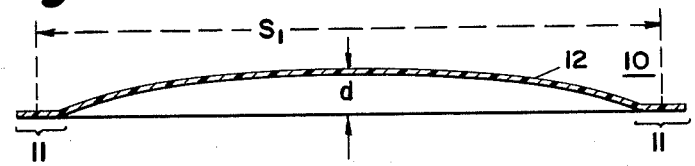
Figure 3:
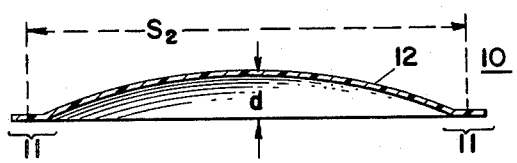
Figure 4:
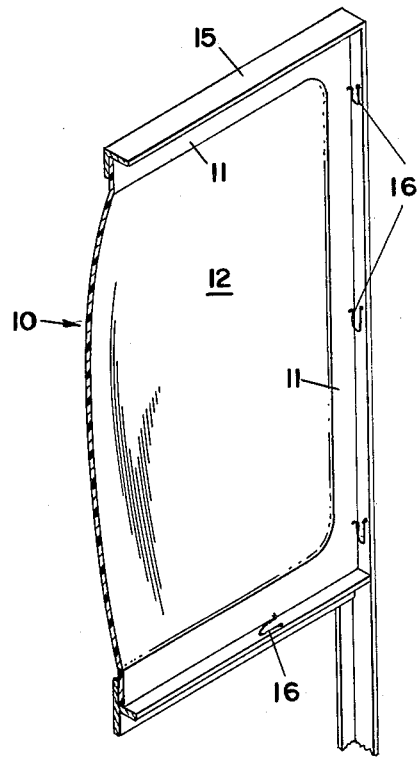

For a more detailed understanding of the invention, reference is made to the following description and to the attached drawings in which:

FIG. 1 is a perspective view of a window pane embodying the invention;

FIGS. 2 and 3 are sectional views, on enlarged scale, respectively taken on lines 2—2 and 3—3 of FIG. 1; and FIG. 4 is a fragmentary sectional view showing a typical installation of the panes of FIG. 1.

The window pane 10 shown in FIG. 1 is made from a flat sheet of rigid polyvinyl chloride (PVC) of substantially uniform thickness in the range from .025″ to .08″. With its relatively narrow border or marginal areas 11 held in the flat, the large central area 12 of sheet 10 is deformed, by known techniques involving application of heat and pressure, into substantially concavo-convex shape so to impart a third dimension or depth to the sheet between its flat marginal areas. After cooling, the curved pane so formed is stable both as to dimensions and shape. It will yield when subjected to significant pressure, but because of its resiliency will return to its formed size and shape.

Assuming the usual case of an oblong pane, the optimum depth "$d$" of the spherical deformation at its deepest point from the plane of the flat marginal area should not be more than about 7.5% of the larger dimension S1 (FIG. 2) of the unsupported span of the plane and not less than about 7.5% of the shorter dimension S2 (FIG. 3) of the unsupported span. If the depth/span factor is significantly less than 7½% (as below 5%), the gain in pane stiffness over a flat sheet is sacrificed whereas if the depth/span factor is significantly above 7½% (as above 10%), the impact strength of the pane suffers, its appearance becomes objectionable and "hot-spots," because of lens effect, becomes possible.

By way of specific example, a PVC pane 10 for a nominal window opening of 14″ x 20″, the depth $d$ should be in the range of from 1″ to 1½″. For this depth of shaping, the thickness of the pane is substantially uniform throughout; for example, it may be .055″±25%. Such shape overcomes the problem of low stiffness common in plastic glazing. When exposed to high-wind loads, the pane actually tightens in the sash or frame, FIG. 4. In case of explosion in the interior of the building, the pane is blown out of the sash without shattering and consequent injury to bystanders. Materially increasing the thickness of the initial flat sheet needlessly and substantially increases the cost whereas materially decreasing the thickness results in substantial loss of impact strength of the pane. The flat border 11 of the pane is but slightly wider than the depth of the frame recess (FIG. 4) and forms but a small fraction (for example, 20%) of the total pane area. Thus, wind pressure distributed over the curved unsupported central span 12 of each pane 10 serves to flatten that curved area and to slide the marginal areas 11 more deeply into the frame recess with little or no possibility that the pane 10 will be blown inwardly by high winds. For the same orientation of the pane, distributed pressure applied to their concave surface by an explosion interiorly of the building pushes them out of frame 15 without shattering and possible consequent injury to bystanders. While the PVC panes, because of their low flame spread, will not contribute to spreading of a fire, they can be knocked into the building by firemen seeking ingress for a fire hose, and the flat marginal areas simply slide out of the frame without shattering or breakage of the pane. The third-dimensional feature of the pane 10 overcomes the problems of bulging and loosening due to inherent high thermal-coefficient of expansion of polyvinyl chloride, the curved section of the pane serving as an expansion joint without effect upon fit of the pane in the sash. If the pane is struck by stones or other hard objects thrown by vandals or by flying workpieces in the building, there is no shattering and the pane, if knocked in or out, may be put back into the frame intact. The PVC panes 10 are also highly resistant to corrosive fumes incident to many industrial metal processings, such as electroplating and pickling, and maintain their good light-transmitting properties over long periods of time. The PVC panes 10 are non-absorbent to water and so do not deteriorate after long exposure to weather or to the humid atmospheres as encountered in many industrial chemical processings.

With the common type of window frame 15 shown, the PVC panes 10 may be installed simply by placing them in the recesses and securing them with glazing clips 16 commonly used with plastic glazing. No putty nor other glazing compound need be used. If edge-sealing is desired, a non-hardening putty may be used.

To accommodate the dimensional variations in frames having the same nominal window opening, the width of the rectangular border 11 of the panes is made sufficiently great to fit the largest frame and may be trimmed on the job with a knife or shears to fit smaller sizes. In the specific example above given, the margin is about 1½″ wide providing a 14.5″ x 20.5″ pane for frames rated to provide a nominal window opening of 14 x 20. The trimming of a PVC pane to smaller sizes of this rating is without danger of breakage and, unlike some previous plastic windows requiring special edge formation, does not introduce mounting problems.

What is claimed is:

1. A window pane suited for industrial buildings and subject to such hazards as fire, fume-corrosion, high wind-loading, explosion and blows from high-velocity objects comprising a rectangular sheet of polyvinyl chloride having a substantially uniform thickness in the range of .025″ to .08″ which is bounded by a flat border whose area is a small fraction of the total pane area, and which from border to border presents a substantially concavo-convex surface whose maximum depth of curvature from the plane of the border area is about 7½% of the span of such surface.

2. A polyvinyl chloride window pane as in claim 1 which is of oblong outline and in which the depth of curvature is not less than about 7½% of the transverse dimension of the span and not more than about 7½% of the longitudinal dimension of the span.

3. A window pane suited for installation within the window frames of industrial buildings and which is subject to such hazards as fire, fume-corrosion, high wind-loading, explosion and blows from high-velocity objects comprising, a preformed sheet of polyvinyl chloride having a substantially uniform thickness in the range of .025 inch to .080 inch which is bounded by a flat border for direct engagement with the frame whose area is a small fraction of the total pane area and which from border to border presents a substantial concavo-convex surface whose maximum depth of curvature from the plane of the border area is about 7½% of the span of such surface whereby accidental inversion of the window pane will not disturb the securement of the pane within the frame due to said flat border.

4. The window pane of claim 3 wherein the edges of the preformed polyvinyl chloride pane are so dimensioned as to be in close contact with the window frame when installed so that upon a force being exerted against said concavo-convex surface, the window panes will abut the window frame and further secure the window pane within the frame without loosening the pane from the frame.

5. The window pane of claim 4 wherein the flat border is wider than the portion of the frame against which it abuts and wherein the area of said flat border is approximately 20% of the total pane area.

References Cited by the Examiner

UNITED STATES PATENTS

| | | |
|---|---|---|
| 2,388,297 | 11/1945 | Slaughter. |
| 2,790,400 | 4/1957 | Wasserman _____ 50—116 X |
| 3,112,535 | 12/1963 | Kinney _____ 50—267 X |
| 3,150,749 | 9/1964 | Robrecht et al. _____ 189—64 |

References Cited by the Applicant

UNITED STATES PATENTS

| | | |
|---|---|---|
| D. 3,239 | 11/1870 | West. |
| D. 90,429 | 8/1933 | Tiedmann. |
| 2,063,901 | 12/1936 | Wicander. |
| 2,093,614 | 9/1937 | Lynch. |
| 2,229,877 | 1/1941 | Wally. |
| 2,556,775 | 6/1951 | Oswald. |
| 2,602,501 | 7/1952 | Roos. |
| 2,794,218 | 6/1957 | Ramsey. |
| 2,818,613 | 1/1958 | Peras. |
| 3,023,864 | 3/1962 | Mostoller. |
| 3,045,787 | 7/1962 | Attwood. |

HARRISON R. MOSELEY, *Primary Examiner.*

A. I. BREIER, *Assistant Examiner.*